United States Patent
Zhu et al.

(10) Patent No.: US 8,914,081 B2
(45) Date of Patent: Dec. 16, 2014

(54) SLEEP MODE CONTROL FOR REAL-TIME SERVICES IN BROADBAND WIRELESS ACCESS COMMUNICATION SYSTEMS

(75) Inventors: Hongfei Zhu, Beijing (CN); Yanling Yao, Beijing (CN); Guobin Sun, Beijing (CN)

(73) Assignee: STMicroelectronics R&D Co. Ltd. (Beijing), Beijing (CN)

( * ) Notice: Subject to any disclaimer, the term of this patent is extended or adjusted under 35 U.S.C. 154(b) by 1202 days.

(21) Appl. No.: 12/018,821

(22) Filed: Jan. 24, 2008

(65) Prior Publication Data

US 2008/0182567 A1    Jul. 31, 2008

(30) Foreign Application Priority Data

Jan. 30, 2007   (CN) .......................... 2007 1 0007916

(51) Int. Cl.
*H04W 52/02*  (2009.01)
(52) U.S. Cl.
CPC .......... *H04W 52/0216* (2013.01); *G04W 28/24* (2013.01); *Y02B 60/50* (2013.01)
USPC ........... 455/574; 455/73; 455/550.1; 455/572
(58) Field of Classification Search
USPC ....................................................... 455/574
See application file for complete search history.

(56) References Cited

U.S. PATENT DOCUMENTS 6,101,608 A    8/2000   Schmidt et al.
6,542,490 B1   4/2003   Ahmadvand et al.
(Continued)

FOREIGN PATENT DOCUMENTS

CN            1592292 A      3/2005
WO    WO 2006/101371 A      9/2006

OTHER PUBLICATIONS

Lee, Neung-Hyung and Bahk, Saewoong, MAC Sleep Mode Control Considering Downlink Traffic Pattern and Mobility, School of Electrical Engineering & Computer Science, Seoul National University, Seoul Korea, IEEE, 2005, pp. 5.

(Continued)

*Primary Examiner* — Lester Kincaid
*Assistant Examiner* — Diego Herrera
(74) *Attorney, Agent, or Firm* — Allen, Dyer, Doppelt, Milbrath & Gilchrist, P.A.

(57) ABSTRACT

Consideration of Quality of Service is taken into account during the establishment of a sleep cycle in a mobile station providing real-time services. Upon the mobile station's identification of a need for a real-time service to enter into sleep mode, a request conveying that need is sent to the base station. The base station replies with a start frame number and other sleep parameters. Thereafter the mobile station enters sleep mode comprising sleep intervals interleaved with listening intervals. To prevent transmission packets from being buffered at the mobile station for an excessive period of time due to attempts to transmit packets to the base station during a sleep interval, the length of the sleep interval is set so as not to exceed the maximum latency value reflecting the QoS of the real-time service negotiated during establishment of the real-time services.

20 Claims, 8 Drawing Sheets

Fig. 3A
Fig. 3B
Fig. 3

(56) References Cited

U.S. PATENT DOCUMENTS

| | | | |
|---|---|---|---|
| 6,622,251 B1 | 9/2003 | Lindskog et al. | |
| 6,848,059 B2 | 1/2005 | Bullman et al. | |
| 7,836,291 B2* | 11/2010 | Yim et al. | 712/244 |
| 2005/0043050 A1 | 2/2005 | Lee et al. | |
| 2005/0049013 A1* | 3/2005 | Chang et al. | 455/574 |
| 2005/0070340 A1* | 3/2005 | Kim | 455/574 |
| 2005/0075148 A1* | 4/2005 | Park | 455/574 |
| 2005/0122936 A1* | 6/2005 | Son et al. | 370/331 |
| 2005/0128990 A1* | 6/2005 | Eom et al. | 370/338 |
| 2005/0197171 A1* | 9/2005 | Son et al. | 455/574 |
| 2006/0030305 A1* | 2/2006 | Lee et al. | 455/418 |
| 2006/0229023 A1* | 10/2006 | Alon et al. | 455/69 |
| 2006/0268891 A1 | 11/2006 | Heidari-Bateni et al. | |
| 2006/0281436 A1* | 12/2006 | Kim et al. | 455/343.2 |

OTHER PUBLICATIONS

Subalakshmi Venugopal et al., "A rendezvous reservation protocol for energy constrained wireless infrastructure networks", Wireless Networks; the Journal of Mobile Communication, Computation and Information, Kluwer Academic Publishers, DO, vol. 13, No. 1, May 8, 2006, XP019468805, ISSN: 1572-8196, pp. 93-105. Abstract.

Chinese Office Action dated Aug. 19, 2010, 06-BJ-016CN01, 200710007916.X.

Chinese Office Action for application 200710007916.X, issued Jun. 15, 2011.

Chinese Office Action for Application 200710007916.X dated Nov. 7, 2013, 5 pgs.

* cited by examiner

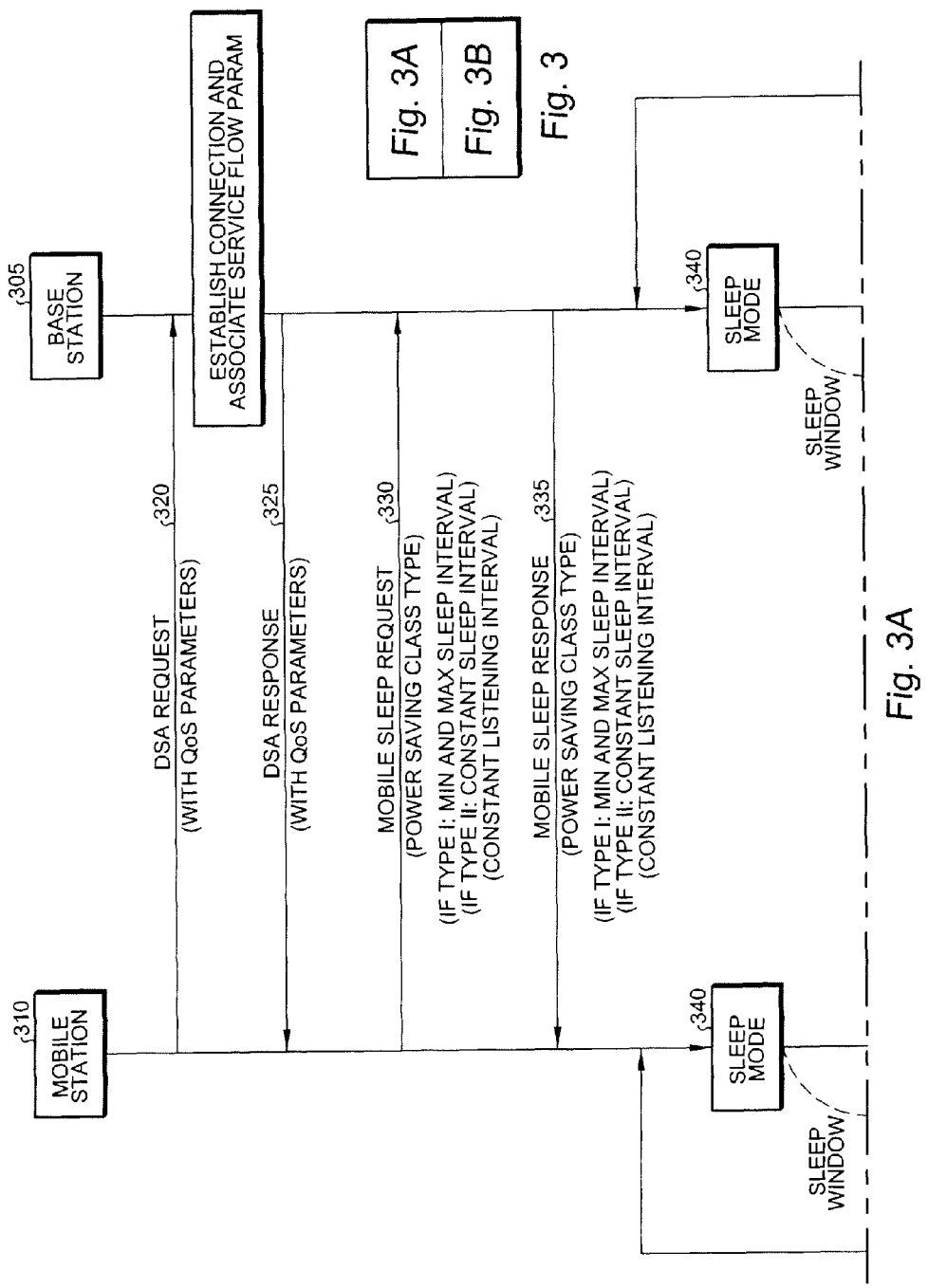

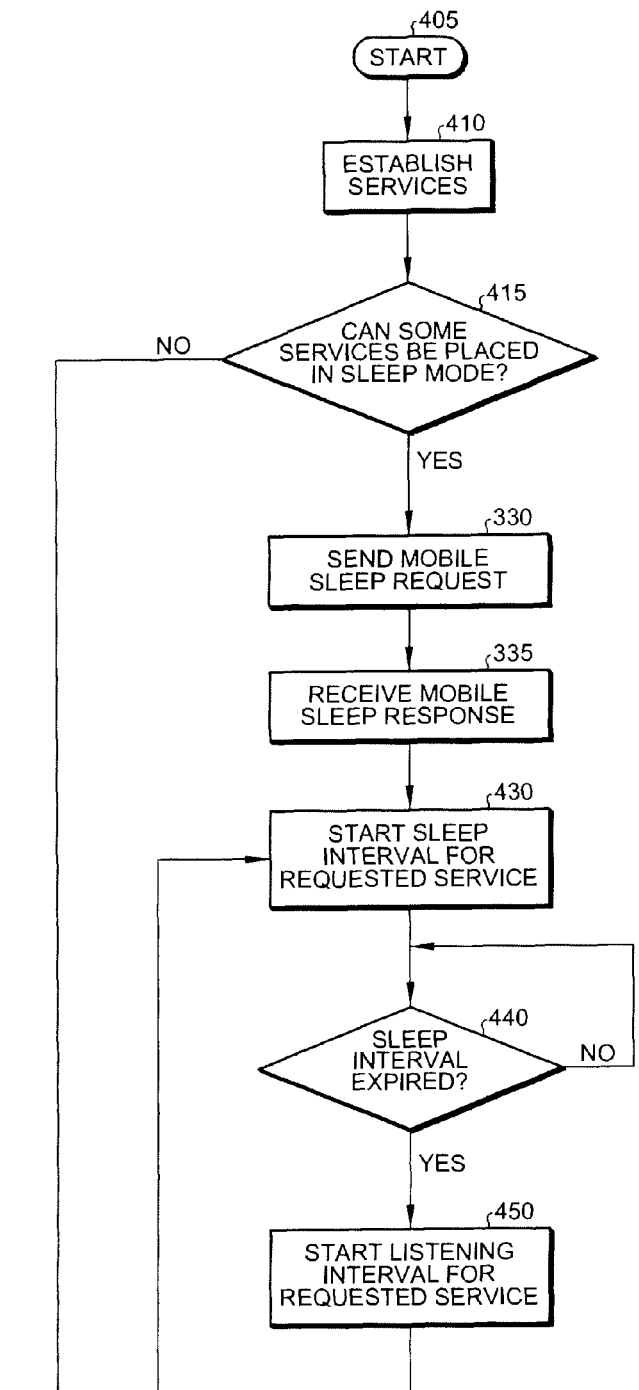
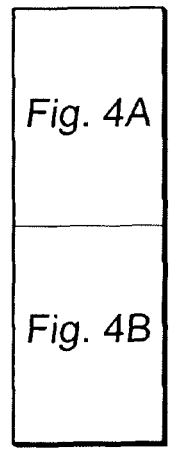
Fig. 4A
Fig. 4

# SLEEP MODE CONTROL FOR REAL-TIME SERVICES IN BROADBAND WIRELESS ACCESS COMMUNICATION SYSTEMS

RELATED APPLICATION

The present application claims priority of Chinese Application No. 200710007916.X filed Jan. 30, 2007, which is incorporated herein in its entirety by this reference.

BACKGROUND OF THE INVENTION

1. Field of the Invention

Embodiments of the present invention relate, in general, to Broadband Wireless Access ("BWA") communication systems, and more particularly to methods for controlling sleep modes for real-time services in BWA communication systems so as to reduce terminal power consumption with minimal quality deterioration.

2. Relevant Background

Broadband Wireless Access is emerging as an integral part of the next generation (4G) wireless access infrastructure. BWA is aimed at providing wireless access to data networks with high data rates. One particular BWA technology is being standardized by IEEE 802.16. According to the 802.16-2004 standard, broadband means "having instantaneous bandwidth greater than around 1 MHz and supporting data rates greater than about 1.5 Mbit/s." From the point of view of connectivity, BWA is an attractive alternative to traditional cable modem, xDSL and T1/E1 connections. At the same time, by taking advantage of the inherent mobility of wireless media, BWA is considered as a candidate technology that enables users, when mobile, to make use of a wide-area network through an access network.

In wireless communication systems, battery power is typically a scarce resource. The batteries of mobile stations have a limited life before they must be recharged. Therefore, a major challenge in operation of wireless communication systems is the efficient use of a limited battery power resource. There are many ways of reducing energy consumption throughout various layers in wireless communication systems. Wireless communication systems primarily occur in the Data-Link layer. Recall that the Open System Interconnection ("OSI") reference model includes 7 primary layers, with each primary layer capable of possessing sub-layers. The primary layers include a Physical layer, a Data-Link layer, a Network layer, a Transport layer, a Session layer, a Presentation layer and finally an Application layer. Sub-layers of the Data-Link layer in which energy consumption can be reduced includes the Media Access Control ("MAC") sub-layer and the Logical Link Control sub-layer. It is the OSI Reference Model Data-Link layer that determines who is allowed to access the physical media at any one time. Recall that the Physical layer, the layer next to the Data-Link layer, is level one in the seven level OSI model of computer networking. It is in the Physical layer that services requested by the Data-Link layer are preformed and refers to network hardware, physical cabling or wireless electromagnetic connections.

Wireless communication occurs in the Data-Link layer thus sleep mode control is properly addressed in this layer. Of the Data-Link's sub-layers, the MAC sub-layer sleep mode control is the simplest way to reduce power consumption. The MAC sub-layer acts as an interface between the Logical Link Control sub-layer and the network's Physical layer. The MAC sub-layer is primarily concerned with the control of access to the physical transmission medium (i.e. which of the stations attached to the wire or frequency range has the right to transmit) or low-level media-sharing protocols like Carrier Sense Multiple Access With Collision Detection.

The general idea of sleep mode control is to put the mobile station into a low power consumption mode when it is not involved in any communications. A mobile station goes into sleep mode after negotiating with the base station and periodically wakes up for a short interval and checks whether there is downlink traffic present. Based on the presence or absence of downlink traffic during these checks, the mobile station elects either to return to sleep mode (i.e. no downlink traffic) or go into active mode (downlink traffic present).

FIG. 1 is a timeline of the typical relationship between sleep and listening intervals that occur when a mobile station enters into sleep mode as is known in the prior art. As shown, a mobile station is generally either in active mode 110 or sleep mode 120. Before the mobile station can enter into sleep mode, the mobile station in active mode must send a sleep request to the base station and await the base station's approval 130.

After gaining approval 130 from the base station, the mobile station goes into sleep mode 120 and enters into a sleep interval 140. Shortly thereafter the mobile station wakes and enters a listening interval 150 to listen for traffic addressed to it. When communications traffic is present the mobile station exits sleep mode 120 and reenters active mode 110. When no traffic is present, after listening for the prescribed interval, the mobile station enters into another sleep interval 140. As long as no traffic is presented to the mobile station during the listening interval 150, the mobile station will remain in sleep mode 120.

One standard for access to Broadband Wireless established by the Institute of Electrical and Electronics Engineers ("IEEE") is referred to as 802.16e. This standard is aimed at filling the gap between fixed wireless local area networks and mobile cellular systems. To increase a mobile station's ability to exist in a standby mode, it proposes the use of sleep mode control. 802.16e allows a mobile station to have multiple connections with differentiated Quality of Service ("QoS"). Sleep mode under 802.16e is based on the concept of power saving classes. Power saving classes are defined as a group of connections that have common demand properties. For each involved mobile station, the base station keeps one or several contexts, each one related to a certain power savings class. A particular power savings class may be repeatedly activated and deactivated. Activation of a certain power savings class results in starting successive sleep/listening cycles associated with each class. Generally there are three power saving classes. Each differs by their parameter sets, procedures of activation/deactivation and policies of mobile station availability for data transmission. Power saving class of type I is typically recommended for non-real-time connections of Best Effort and non-real-time Variable Rate connections. Power saving class of type II is typically recommended for real-time connections including Unsolicited Grant Service and real-time Variable Rate type connections. Power saving class of type III is typically recommended for multicast connections as well as for management operations, for example, Periodic Ranging, DSx operations, Mobile Neighbor Advertisement, and the like. Power saving class of type I enters sleep mode 120 at the frame specified as Start Frame Number for the first sleep interval 140. Sleep intervals 140 are interleaved with listening intervals 150 of fixed duration. Each updated sleep interval 140 thereafter is twice the size comparatively to the previous one, but not greater than a specified final value.

During the sleep interval 140 of a power savings class type I operation, the mobile station is not expected to send or receive any traffic connections that belong to power savings class I. During the listening interval 150, the mobile station is expected to receive all downlink transmissions in the same way as it would in active mode 110.

Sleep intervals 140 associated with power savings class II enters are all of the same length and are interleaved with listening intervals 150, also of a fixed duration. During the sleep interval 140 the mobile station is prevented from receiving or transmitting data. During the listening interval 150 the mobile station can both send and receive any packets as well as acknowledge that it has received them.

Power savings class III enters a determinable sleep interval 140 much like power savings class I and II. The duration of the sleep interval 140 is a determinable period of time. After the expiration of the sleep interval 140 power savings class III operations automatically go back to active mode. FIG. 2 shows a prior art timeline of a typical behavior of a mobile station with two power savings classes according to 801.16e sleep mode standards. Class A 210 contains several best effort and non-real-time variable rate connections. Class B 220 contains a single unsolicited grant service connection. For class B 220 the base station allocates a sequence of listening intervals 230 of a constant duration and a sleep interval 240 of a constant duration. For Class A 210 the base station allocates a sequence of listening intervals 250 of constant duration and doubles that length for the sleep interval 260. The mobile station is considered to be unavailable 270, i.e. powered down, only when there are intersected sleep intervals 240, 260 of class A 210 and class B 220. Similarly, intervals of availability 280 exist when only one or neither of the classes are experiencing a sleep interval 240, 260.

Although sleep mode control has proved to be an effective tool for power resource savings, the savings comes at the price of a deterioration of QoS. A long sleep interval is clearly advantageous from the perspective of power conservation, but such a prolonged interval creates an extended buffering delay. Alternatively, a short sleep interval decreases the buffer delay but results in frequent awakenings to check packet intervals thus expending valuable power resources. A tradeoff exists therefore between a longer sleep interval, which conserves power, and a shorter sleep interval that provides better performance.

One attempt to resolve this dilemma was offered in a paper entitled, "MAC Sleep Mode Control Considering Downlink Traffic Pattern and Mobility," Proc. IEEE, Vehicular Technology Conference, Vol. 3, pp. 2076-2080, 30 May-1 Jun. 2005. This prior solution proposes a sleep mode interval control algorithm according to MAC states. The MAC states are classified into two modes: sleep mode and awake mode. Two states in sleep mode are suggested, doze and power save. Which states in sleep mode the mobile station enters into is based on the MAC state in awake mode. When the MAC state in awake mode is idle, i.e. no connections for data transmissions exist, the mobile stations can enter a doze state. In doze the mobile station goes to sleep. When the MAC state in awake mode is active, but there has been a relatively long period wherein there has been no traffic, the mobile station can enter a power save state. Power save is of a short time period in comparison to doze. Therefore the sleep mode control method is different for power save and doze states.

While this approach provides the mobile station with a greater degree of flexibility to manage its power consumption, the deterioration of QoS during long sleep intervals remains unaddressed. This problem is especially pronounced when real-time services are considered.

SUMMARY OF THE INVENTION

Briefly stated, embodiments of the present invention involve controlling sleep modes in real-time services for broadband wireless communications. In one embodiment of the present invention, a mandatory QoS parameter, such as maximum latency, is taken into account during sleep interval selection and synchronization. By taking QoS into account, the sleep mode control can be tailored to the QoS requirement of each real-time service.

According to one embodiment of the present invention, a maximum latency value is negotiated for each wireless real-time service established between a mobile station and a base station. Upon the mobile station's identification of a need for a real-time service to enter into sleep mode, a request conveying that information is sent to the base station. The base station replies with a start frame number and other sleep parameters. Thereafter the mobile station enters sleep mode comprising sleep intervals interleaved with listening intervals. To prevent transmission packets from being buffered at the mobile station for an excessive period of time due to attempts to transmit packets to the base station during a sleep interval, the length of the sleep interval, according to one embodiment of the present invention, is set so as not to exceed the maximum latency value reflecting the negotiated QoS of the real-time service.

In another embodiment of the present invention, the sleep cycle of the mobile station is synchronized with the base station. The mobile station monitors frame latency and upon determining that the frame latency exceeds the maximum frame latency for a real-time service, as negotiated during the establishment of that wireless service, the mobile station directs itself and the base station to shift the next sleep cycle so as to align packet transmission with the listening interval of the mobile station.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
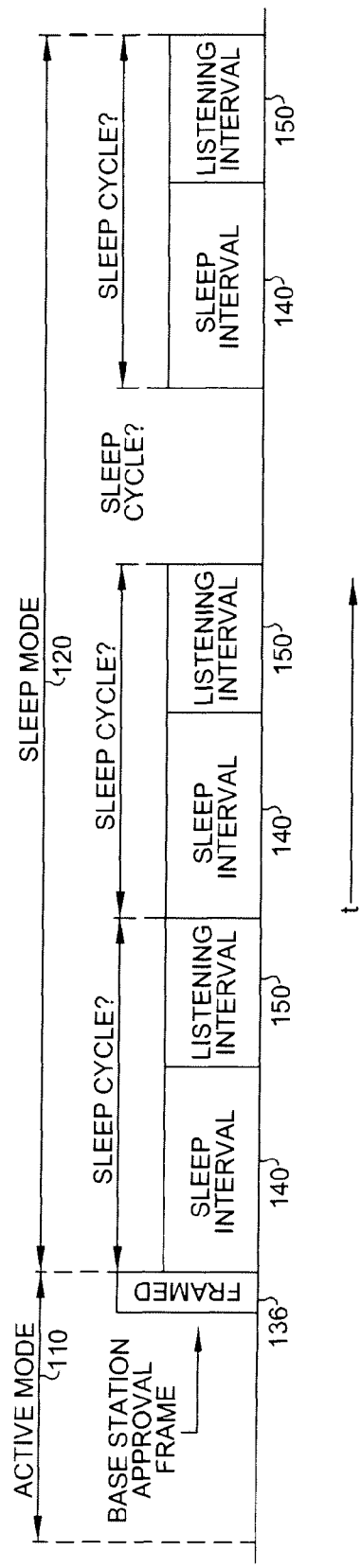
FIG. 1 shows a sleep mode timeline for interaction between a mobile station and a base station as is known in the prior art.
Figure 2:
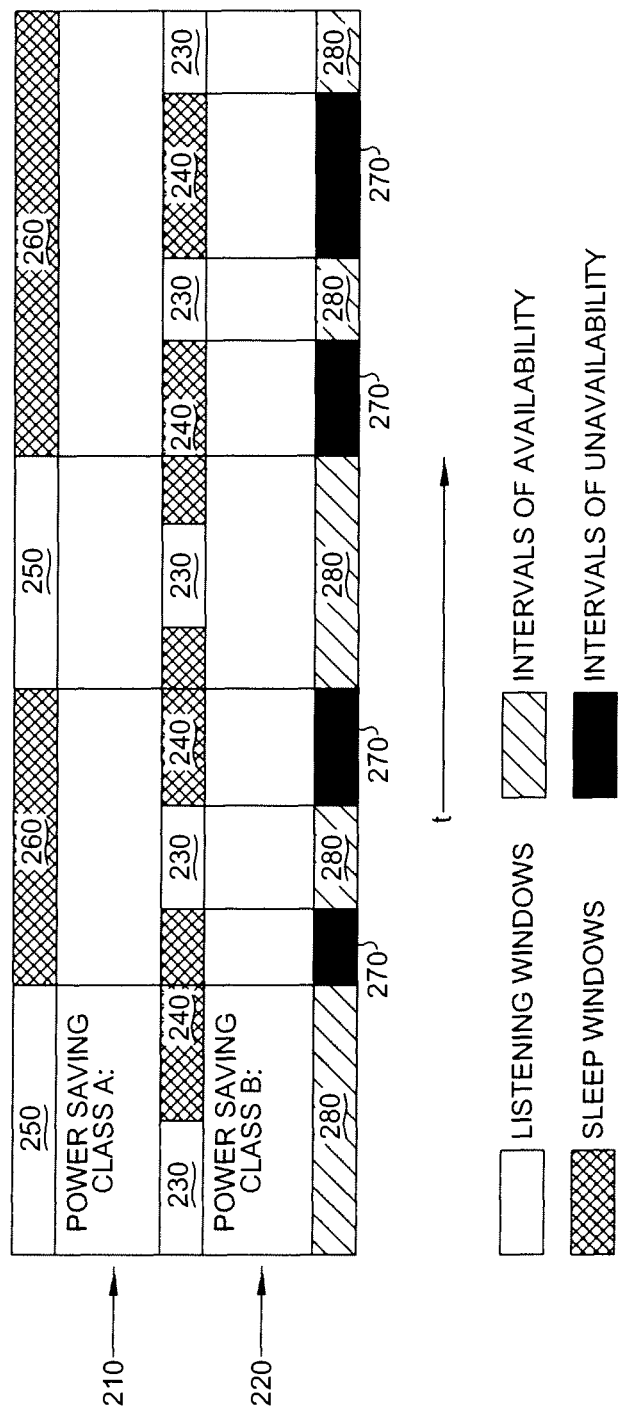
FIG. 2 shows a 802.16e sleep mode timeline for interaction between a mobile station and a base station as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION OF THE PREFERRED EMBODIMENTS

Specific embodiments of the present invention are hereafter described in detail with reference to the accompanying figures. Like elements in the various figures are dented by life reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

Figure 3B:
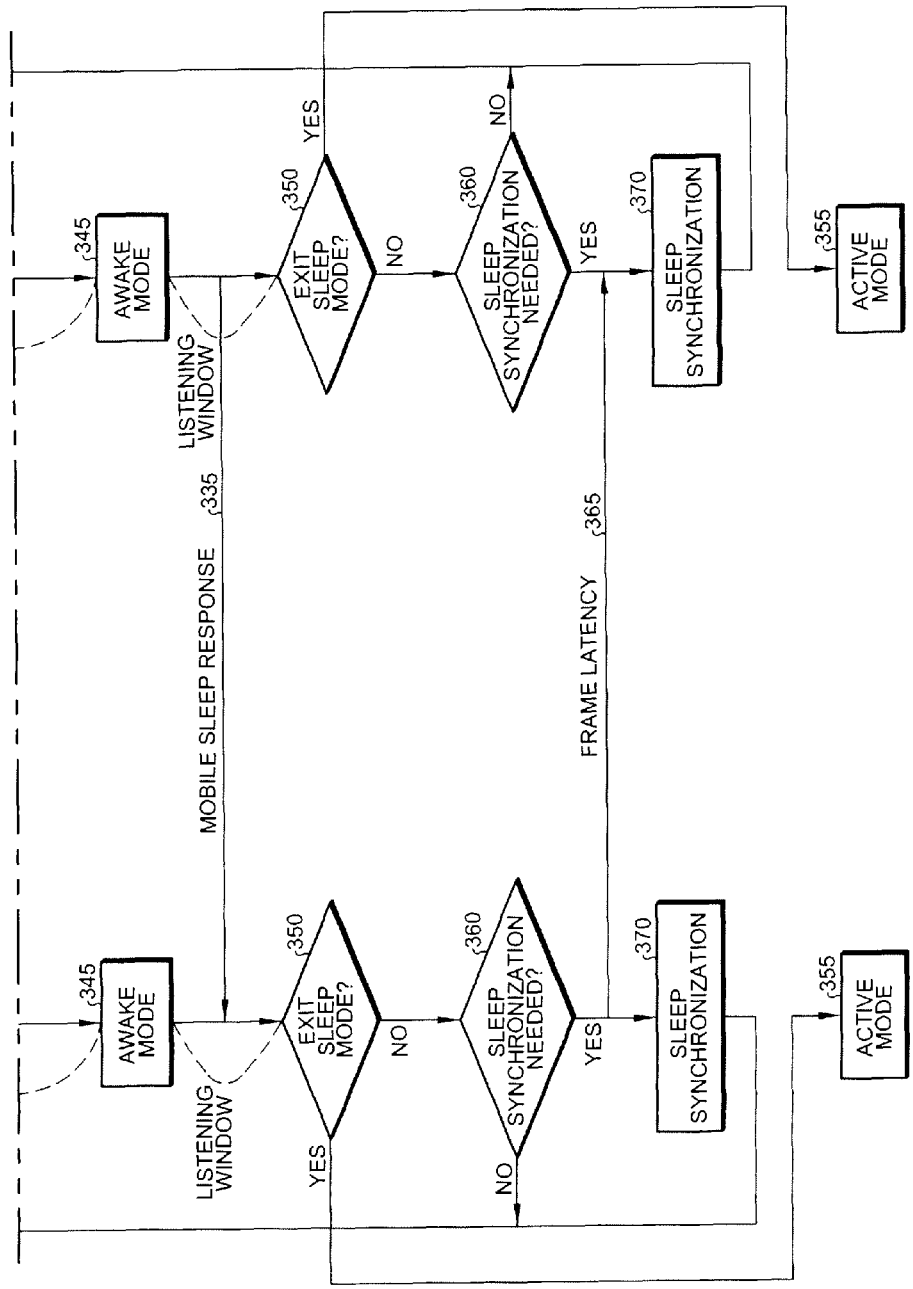
FIG. 3 shows a flow chart of one method embodiment for controlling sleep modes for real-time service according to the present invention.
Figure 4B:
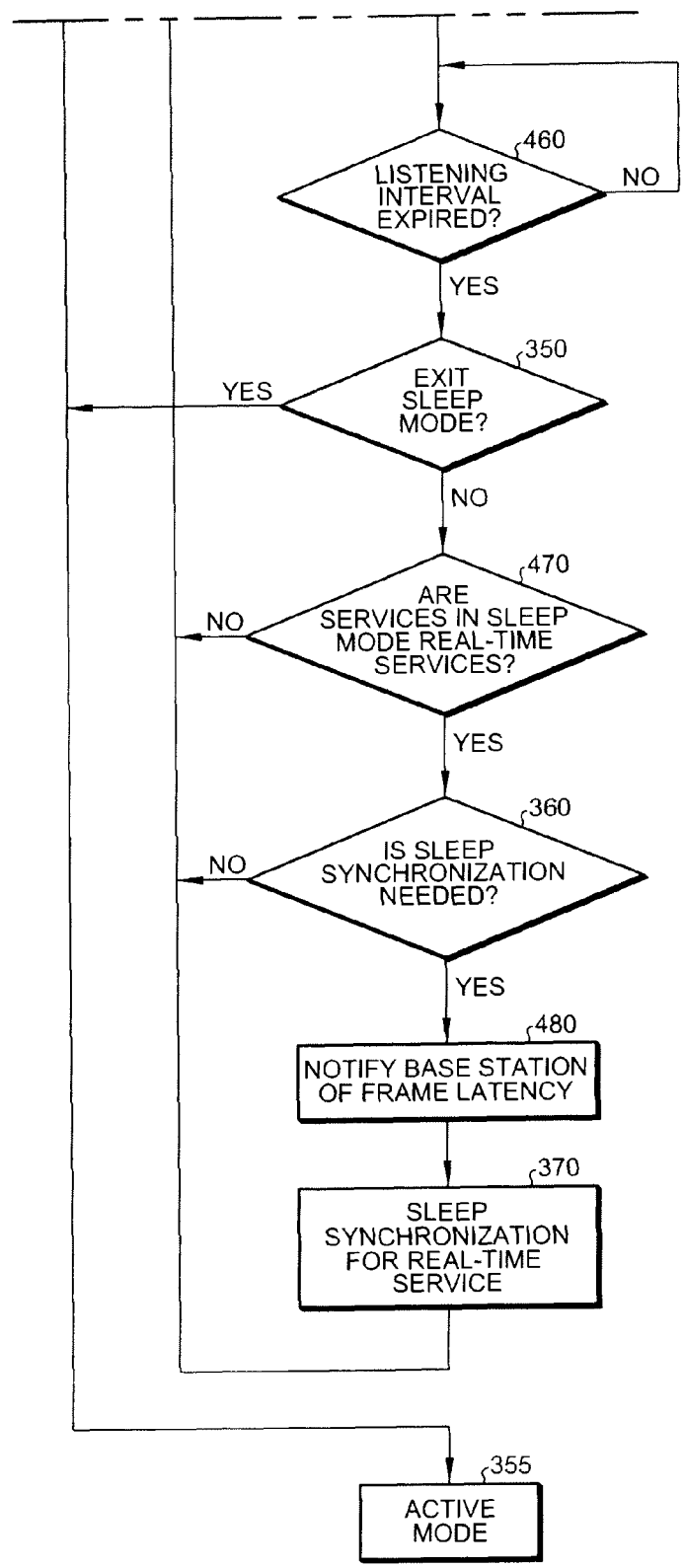
FIG. 4 shows an expanded view of one method embodiment for controlling sleep modes for real-time services from the perspective of a mobile station according to the present invention.
Figures 5, 5A:
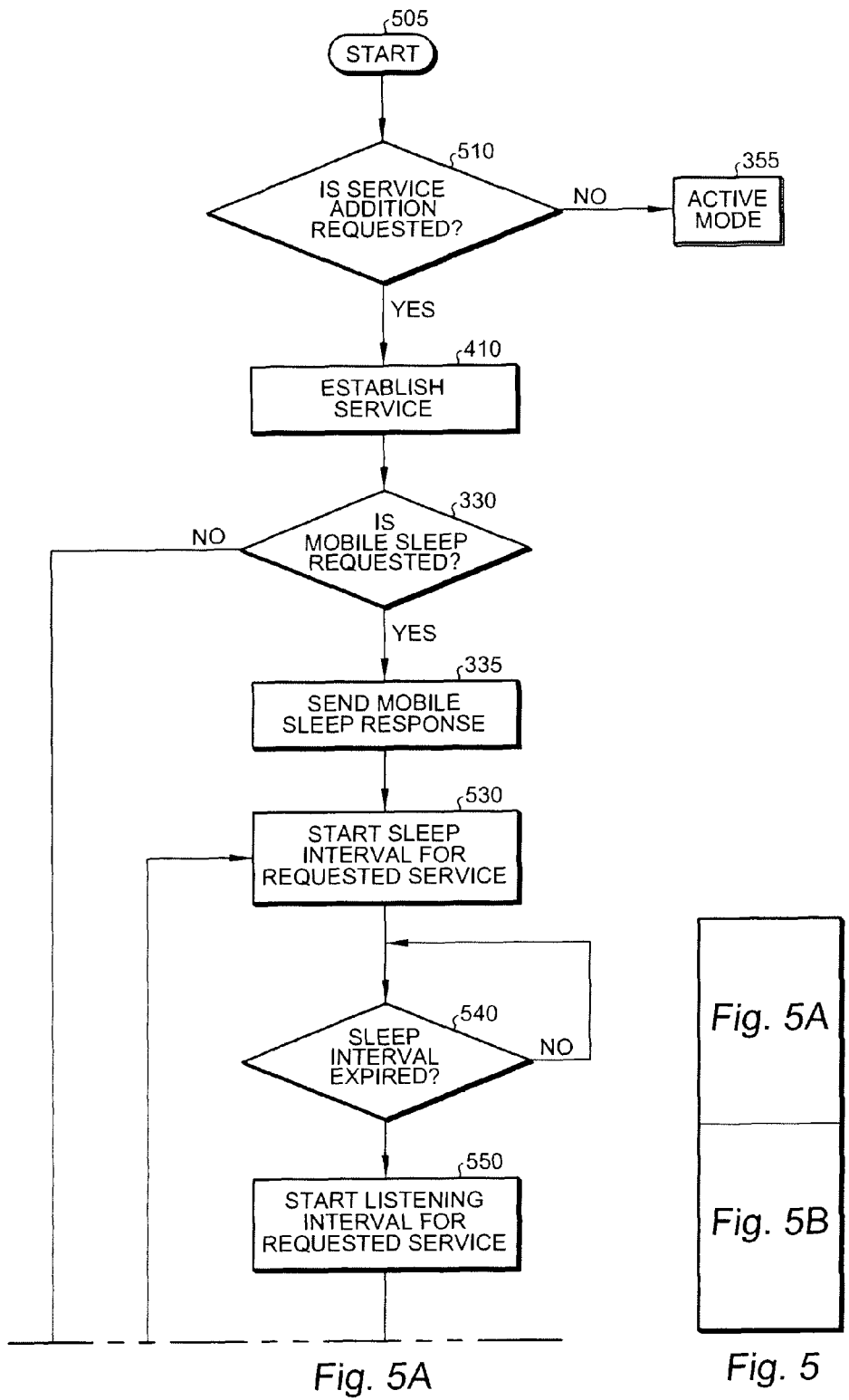
FIG. 5 shows an expanded view of one method embodiment for controlling sleep modes for real-time services from the perspective of a base station according to the present invention.
Figure 5B:
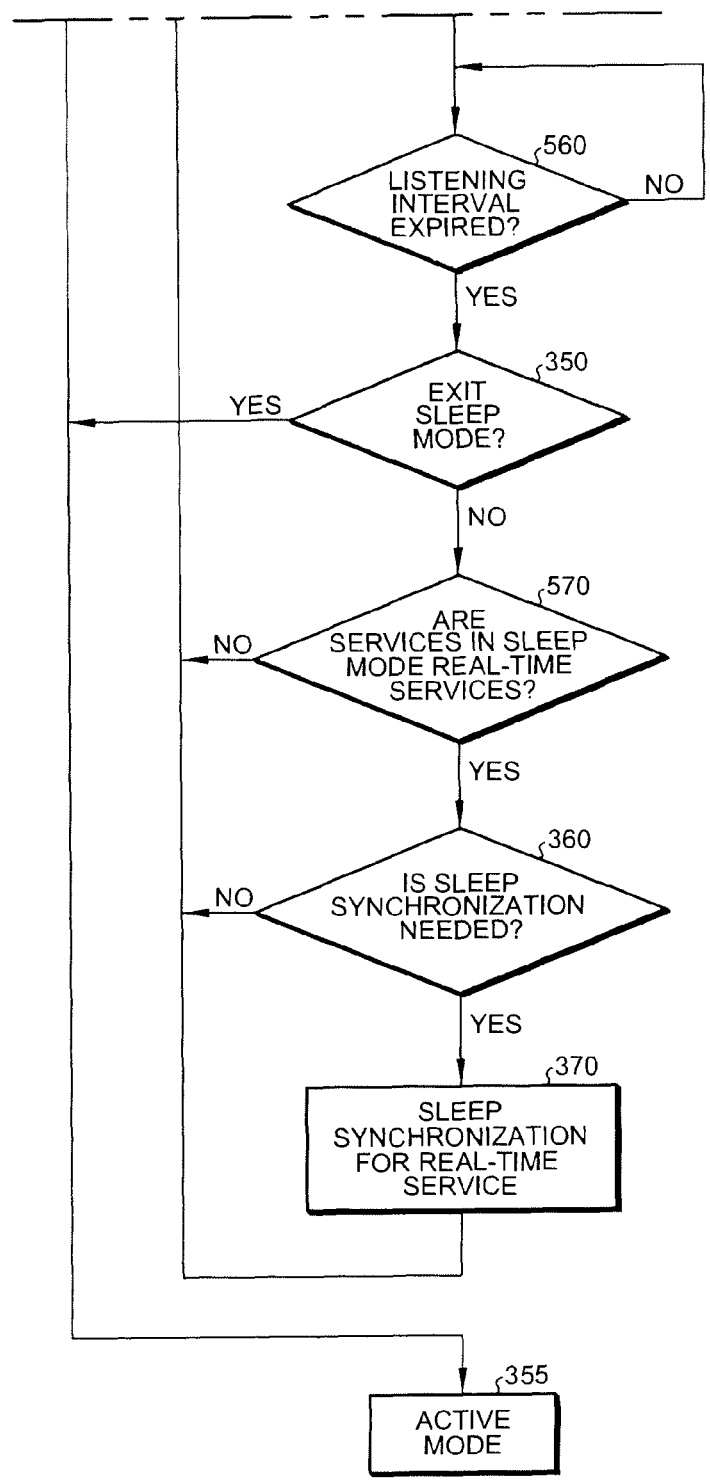

FIGS. 3-5 are flowcharts illustrating methods of implementing an exemplary process for controlling sleep modes for real-time service. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which executed on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 3 shows a flow chart of one method embodiment for controlling sleep modes for real-time service according to the present invention. The steps shown in FIG. 3 illustrate exemplary processing procedures between a base station 305 and a mobile station 310. According to one embodiment of the present invention, QoS parameters are shared between a base station 305 and a mobile station 310 to be used in controlling sleep modes. The QoS parameter set is negotiated between the base station 305 and the mobile station 310 during a Dynamic Service Add ("DSA") 320 procedure. Once the mobile station 310 experiences a need to establish new wireless service it sends a DSA request 320 message comprising a set of QoS parameters. Upon receiving the DSA request 320 from the mobile station 310, the base station 305 responds with a DSA response 325. The DSA response 325 includes an acknowledgement of the QoS parameters sent by the mobile station 310. Thus, prior to the mobile station 310 entering into a sleep mode the base station 305 and the mobile station 310 know the QoS requirements for each service.

When the mobile station 310 desires to enter into sleep mode, i.e. a sleeping station, the mobile station 310 communicates a mobile sleep request 330 to the base station. The mobile sleep request 330 includes, among other things, power savings class type, sleep interval and listening interval. Once the mobile sleep request 330 has been received from the mobile station 310, the base station 305 responds with a mobile sleep response 335. The mobile sleep response 335 either denies the request for various reasons as are known to one skilled in the art, or approves the request. When the request is approved, the base station 305 determines a start frame number of the sleep mode and communicates that number to the mobile station 310.

Upon successful completion of this negotiation process, the mobile station 310 enters sleep mode of the approved class at the frame specified by the base station 305. At the frame specified, the mobile stations 310 enter sleep mode 340 by going into its first sleep interval. Sleep intervals, or windows as they are sometimes referred, are, in one embodiment of the present invention, interleaved with listening intervals. Of course, more classes may be defined and negotiated between the mobile station and the base station as will be apparent to one skilled in the art. The embodiment of the present invention shown in FIG. 3 comprises just one power saving class. The first power saving class identifies and negotiates a minimum and maximum sleep interval duration. The second power saving class establishes constant sleep and listening intervals lengths, although the sleep interval can be different from the listening interval.

Upon completion of the prescribed sleep interval the mobile stations 310 enter an awake mode 345 and transition from a sleep interval to a listening interval. During this interval the mobile station 310 can both send and receive data and requests that are properly addressed.

According to one embodiment of the present invention, the power savings class' sleep mode continues on the mobile station 310 until the base station 305 sends a mobile sleep response 335 during a listening interval indicating that the sleep mode should exit. As shown in each path of the flow diagram of FIG. 3, a query is performed to determine 350 whether sleep mode should be exited. Upon a positive determination of the query that sleep mode should be exited, the mobile station 310 takes steps to enter active mode 355. The current power savings class is thereafter deactivated and normal (active) 355 operations are resumed between the base station 305 and the mobile station 310 upon the end of the listening interval.

Another aspect of the present invention is the establishment of sleep synchronization between the base station and the mobile station. Real-time services necessitates the synchronization of sleep intervals and packet transmission by the mobile station.

Real-time services are obviously not available during a sleep interval. Accordingly, the performance of a real-time service is significantly deteriorated by the existence of a sleep interval, especially when the sleep interval is chosen arbitrarily. For example, a long sleep interval may lead to a relatively long period of unavailability which can cause an intolerable delay. On the other hand, when the sleep interval is too short, the power efficiency is reduced due to frequently awaking. Another problem is that arbitrary sleep interval selection performs the same operation for all the real-time services, even though the QoS requirements for each service are different.

Therefore, to cater to the critical delay requirement of real-time service, which is negotiated as maximum latency in the dynamic service add procedure, one embodiment of the present invention sets sleep interval size for each real-time service according to its maximum latency. One exemplary method is to take maximum latency as sleep interval, and to set one sleep cycle (i.e. sleep interval plus listening interval) as an integral multiple of the frame generation interval. In this case, the ideal condition occurs when the sleep interval starts just after transmitting one packet. This is termed as the synchronized state.

In one embodiment of the present invention, with the mobile station 310 in sleep mode, a query is made to determine 360 when such synchronization is needed. Upon a positive response to that query, a frame latency value 365 is set. This value is set, in one embodiment of the present invention, in the grant management sub-header so as to eliminate or at least reduce packet transmission buffering. Synchronization reduces the excessive delay caused by buffering, which in real-time services, can lead to unacceptable QoS results. Once a frame latency value 365 is set, the sleep mode 340, sleep and listening intervals of the mobile station 310, and the packet transmission of the mobile station 310 are synchronized.

FIG. 4 shows an expanded view of one method embodiment for controlling sleep modes for real-time services from the perspective of a mobile station 310 according to the present invention. The process for controlling sleep mode in a mobile station begins 405 with the establishment of real-time wireless services 410 between a base station 305 and a mobile station 310. After service has been established, the mobile station 310 determines 415 whether it is necessary to place the services being offered into sleep mode. A response in the negative results in the mobile station 310 remaining in active mode 355. A positive response by the mobile station 310 results in a sleep request 330 being sent to the base station 305 and a response 335 being shortly thereafter received.

With reception of a favorable response 335 to the sleep request 330 issued to the mobile station 310 from the base station 305, the mobile station 310 begins sleep intervals for each of the approved services. The length of the sleep interval and other parameters are conveyed to the mobile station 310 as part of the sleep request response 335 including a maximum frame latency value. During the sleep interval a query is poised to determine 440 when the sleep interval has expired. A positive answer to that query results in the sleep interval ending and the listening interval 450 beginning. Again a query is conducted to determine 460 whether the listening interval has expired. Once the listening interval has expired a determination is made to determine 350 whether sleep mode should be exited. When it is determined 350 that sleep mode should be exited, such as pending or buffered packets, the system is placed back into active mode 355. When the decision is to remain in sleep mode, a query is then made to determine 470 whether the services in sleep mode are real-time services.

When the services are not real-time the method maintains interleaving sleep and listening intervals until it is determined that the sleep mode should be exited and the system returned to active mode. When the sleep service is identified as involving real-time services, the question 360 of sleep synchronization is raised. When sleep window starts just a little before packet transmission, the packet must be buffered until the first frame in next listening window. This synchronization mismatch will introduce an additional delay at the transmitter side that may exceed QoS requirements. During the listening interval for a real-time service, the mobile station monitors and detects when latency experienced by the real-time service exceeds the pre-established latency limit. This limit is referred to as maximum latency and is established during the establishment of wireless services. When such a detection occurs, the mobile station demands that the base station synchronize the packet transmissions of the mobile station to match the listening intervals for that service by setting the frame latency and the frame latency indication fields in the grant management sub-header. The frame latency field is used to indicate to the base station the number of frames previous to the current frame in which the transmitted data was available. The frame latency indication field is used to indicate whether the frame latency field is enabled.

When the base station detects that the frame latency is set during a listening interval, the base station will shift its next sleep cycle accordingly and reset its frame latency. Thus, when sleep synchronization is deemed necessary, the base station 305 is notified 480 of frame latency so as to establish 370 synchronized sleep services for real-time services.

According to one embodiment of the present invention, the shift method is to delay the start of a sleep interval by a shift value as found by:

$$ShiftValue = (Frame\ Latency) \times (Frame\ Duration) - (Maximum\ Latency)$$

where:
Frame Latency is the maximum latency of real-time service in a frame unit Frame Duration is the period of one physical frame, and Maximum Latency is the maximum tolerated delay of real-time service.

The latency detection and the sleep interval continue until the latency detected at the mobile station is within the predetermined tolerated value. Thus sleep synchronization is triggered when actual latency exceeds maximum latency.

FIG. 5 shows an expanded view of one method embodiment for controlling sleep modes for real-time services from the perspective of a base station according to the present invention. The flow chart of FIG. 5 mirrors that of FIG. 4 but from the advantage point of the base station. The process once again begins 505 with the base station recognizing that a request 510 has been made to establish service. As previously described, service between the base station 305 and the mobile station 310 is established 410 including QoS settings. At some point thereafter the base station 305 receives a request 330 to establish a sleep mode on one of the mobile stations 310 with which it interacts. With a lack of requests 330 to enter into sleep mode, the system remains in active mode 355. When a sleep request 330 is present the base station analyzes the request and issues a sleep response 335.

Thereafter the base station 305 recognizes that the mobile station 310 is entering into sleep mode of the identified service according to the negotiated parameters. A query by the base station 305 runs during the sleep interval asking whether 540 the sleep interval has expired. Upon expiration of the sleep interval a listening interval begins 550. Again a query is run during the listening interval to determine whether 560 the listening interval has expired. At the end of the listening interval a determination 350 is made whether sleep mode should be exited. When necessary sleep mode may then be exited and the system placed in active mode 355. When it is deemed that there is no need to exit sleep mode the question regarding real-time services is raised. Specifically, the base station 305 determines whether the service placed in sleep mode involves real-time services 570. If not, the sleep/listening intervals continue to be interleaved until such a time when it is deemed that sleep mode should be exited. When the services in sleep mode do involve real-time services it is determined whether sleep synchronization 360 is required. Synchronization is required when packet transmissions are being buffered to the point that maximum frame latency is being exceeded. When synchronization is judged to be required, sleep synchronization between the base station 305 and the mobile station is established 370. Thus, synchronization prevents packets from being buffered longer than the maximum frame latency value and accordingly prevents degradation of QoS below the negotiated levels for each real-time service. If synchronization is not needed, the mobile station simply buffers packets until circumstances warrant a change in state.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with specific computer virtualization architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of, or in addition to, features already described herein. Although claims have been formulated in this application to particular combinations of features, it should be understood that the scope of the disclosure herein also includes any novel feature, or any novel combination of features disclosed, either explicitly or implicitly, or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A computer implemented method for controlling sleep modes used with broadband wireless access communication system's real-time services, the method comprising:

establishing wireless service between a base station and a mobile station wherein the base station and the mobile station set a maximum latency value required while running each real-time service;

receiving at the base station a sleep request from the mobile station to enter into a sleep mode wherein the sleep request identifies sleep parameters;

sending from the base station to the mobile station a sleep response selecting sleep parameters wherein sleep parameters include a start frame number for a sleep interval and a power savings class;

initiating the sleep interval at the mobile station at the start frame number wherein the sleep interval is set according to the power savings class and according to the maximum latency value for each real-time service;

responsive to the completion of the sleep interval, initiating a listening interval at the mobile station according to the power savings class;

synchronizing the listening interval of the mobile station with packet transmission from the mobile station; and responsive to the base station transmitting to the mobile station during the listening interval at the mobile station, terminating the sleep mode and resuming normal operations.

2. The computer implemented method of claim 1, wherein the maximum latency value is set according to a maximum tolerated delay of real-time service.

3. The computer implemented method of claim 1, wherein a maximum sleep interval is set as the maximum latency value and a sleep cycle, wherein the sleep cycle comprises the sleep interval combined with the listening interval, is set as an integral multiple of frame generation.

4. The computer implemented method of claim 3, wherein synchronizing comprises the base station shifting the sleep cycle for real-time services by frame latency.

5. The computer implemented method of claim 1, wherein the power savings class directs the sleep interval to be a first constant length and the listening interval to be a second constant length wherein the sleep interval and the listening interval are interleaved.

6. The computer implemented method of claim 1, wherein the power savings class sets a maximum time period and a minimum length for the sleep interval and a maximum and a minimum time period for the listening interval.

7. The computer implemented method of claim 1, wherein synchronizing prevents packet transmissions from being buffered.

8. The computer implemented method of claim 7, wherein synchronizing results in the sleep interval beginning immediately subsequent to the mobile station transmitting one packet.

9. The computer implemented method of claim 7, responsive to the mobile station identifying latency exceeding the maximum latency value, setting frame latency and frame latency indication in a grant management sub-header.

10. The computer implemented method of claim 9, responsive to frame latency being set in the grant management sub-header, shifting the sleep cycle by a value equal to a product of frame latency and frame duration, minus the maximum latency value.

11. At least one non-transitory computer-readable medium containing a computer program product for controlling sleep modes used with broadband wireless access communication system's real-time services, the computer program product comprising:

program code for establishing wireless service between a base station and a mobile station wherein the base station and the mobile station set a maximum latency value required while running each real-time service;

program code for receiving at the base station a sleep request from the mobile station to enter into a sleep mode wherein the sleep request identifies sleep parameters;

program code for sending from the base station to the mobile station a sleep response selecting sleep parameters wherein sleep parameters include a start frame number for a sleep interval and a power savings class;

program code for initiating the sleep interval at the mobile station at the start frame number wherein the sleep interval is set according to the power savings class and according to the maximum latency value for each real-time service;

program code responsive to the completion of the sleep interval, for initiating a listening interval at the mobile station according to the power savings class;

program code for synchronizing the listening interval of the power savings class with mobile station packet transmissions; and program code responsive to the base station transmitting to the mobile station during the listening interval at the mobile station, for terminating the sleep mode and resuming normal operations.

12. The computer program product of claim 11, wherein a maximum sleep interval is set as the maximum latency value and a sleep cycle, wherein the sleep cycle comprises the sleep interval combined with the listening interval, is set as an integral multiple of frame generation.

13. The computer program product of claim 12, wherein synchronizing comprises the base station shifting the sleep cycle for real-time services by frame latency.

14. The computer program product of claim 13, wherein synchronizing results in the sleep interval beginning immediately subsequent to the mobile station transmitting one packet.

15. The computer program product of claim 11, wherein synchronizing prevents packet transmissions from being buffered.

16. The computer program product of claim 14, responsive to the mobile station identifying latency exceeding the maximum latency value, setting frame latency and frame latency indication in a grant management sub-header.

17. The computer program product of claim 16, responsive to frame latency being set in the grant management sub-header, shifting the sleep cycle by a value equal to a product of frame latency and frame duration, minus the maximum latency value.

18. A computer system for controlling sleep modes in real-time broadband wireless access communication system services, the computer system comprising:
  a processor;
  a software portion configured to establish real-time wireless service between a base station and a mobile station wherein the base station and the mobile station set a maximum latency value required while running each real-time service;
  a software portion configured to initiate a sleep interval at the mobile station at a start frame number wherein the sleep interval is set according to a power savings class and according to a maximum latency value for each real-time service;
  a software portion configured to synchronize a listening interval of the power savings class with mobile station packet transmissions; and
  a software portion configured to resume normal operations responsive to the base station transmitting to the mobile station during the listening interval.

19. The computer system of claim 18, wherein a maximum sleep interval is set as the maximum latency value and a sleep cycle, wherein the sleep cycle comprises the sleep interval combined with the listening interval, is set as an integral multiple of frame generation.

20. The computer system of claim 18, further comprising a software portion configure to synchronize the listening interval at the mobile station with its packet transmissions so as to prevent packet transmissions from being buffered.

* * * * *